(12) United States Patent
Simmons

(10) Patent No.: US 7,051,917 B2
(45) Date of Patent: May 30, 2006

(54) BEAM END WELD PREPARATION

(76) Inventor: Robert J. Simmons, 27308 Fairview Ave., Hayward, CA (US) 94542

( * ) Notice: Subject to any disclaimer, the term of this patent is extended or adjusted under 35 U.S.C. 154(b) by 267 days.

(21) Appl. No.: 10/699,759

(22) Filed: Nov. 3, 2003

(65) Prior Publication Data

US 2004/0089699 A1 May 13, 2004

Related U.S. Application Data

(60) Provisional application No. 60/424,082, filed on Nov. 5, 2002, provisional application No. 60/463,898, filed on Apr. 16, 2003.

(51) Int. Cl.
   *B23K 31/02* (2006.01)
   *B21D 39/00* (2006.01)
   *E04C 5/08* (2006.01)

(52) U.S. Cl. ............ 228/165; 228/182; 52/223.8; 52/223.9

(58) Field of Classification Search .......... None
See application file for complete search history.

(56) References Cited

U.S. PATENT DOCUMENTS

| | | | | |
|---|---|---|---|---|
| 2,284,923 A | * | 6/1942 | Schick | 52/326 |
| 2,370,638 A | * | 3/1945 | Crowe | 52/408 |
| 3,385,015 A | * | 5/1968 | Hadley | 52/223.8 |
| 5,655,602 A | | 8/1997 | Collins | |
| 5,829,716 A | * | 11/1998 | Kirkwood et al. | 244/117 R |
| 6,047,774 A | | 4/2000 | Allen | |

\* cited by examiner

*Primary Examiner*—Lynne R. Edmondson
(74) *Attorney, Agent, or Firm*—Jon M. Dickinson PC; Robert D. Varitz PC

(57) ABSTRACT

Preparation of a weld between a structural I-beam end and a beam-to-column attaching end component wherein no beam flange material is removed to participate in the creation of a weld trough. Instead, the space for a weld trough is created in the end component, and this trough is prepared with enough all-over length to establish run-on and run-off regions for molten weld material, which regions extend laterally outwardly from the opposite transverse ends of a flange. Full-section welds between a beam's flanges and the attaching end component are achieved without the need to use any run-on and run-off tabs, and also without the need to employ any traditionally-used backing bars.

6 Claims, 3 Drawing Sheets

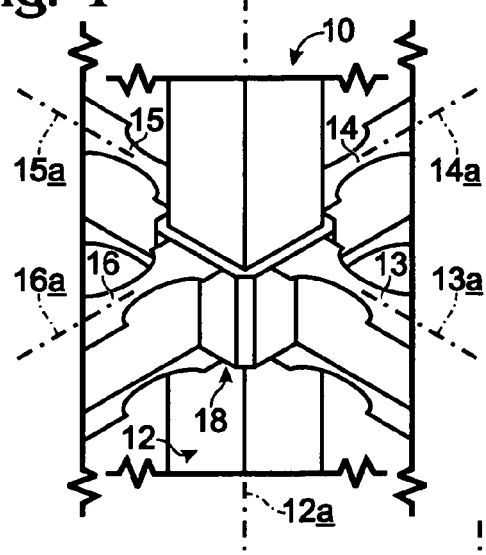
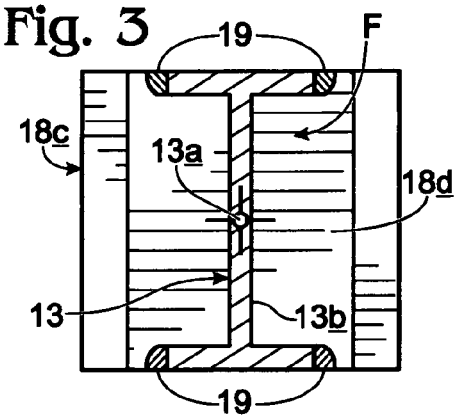
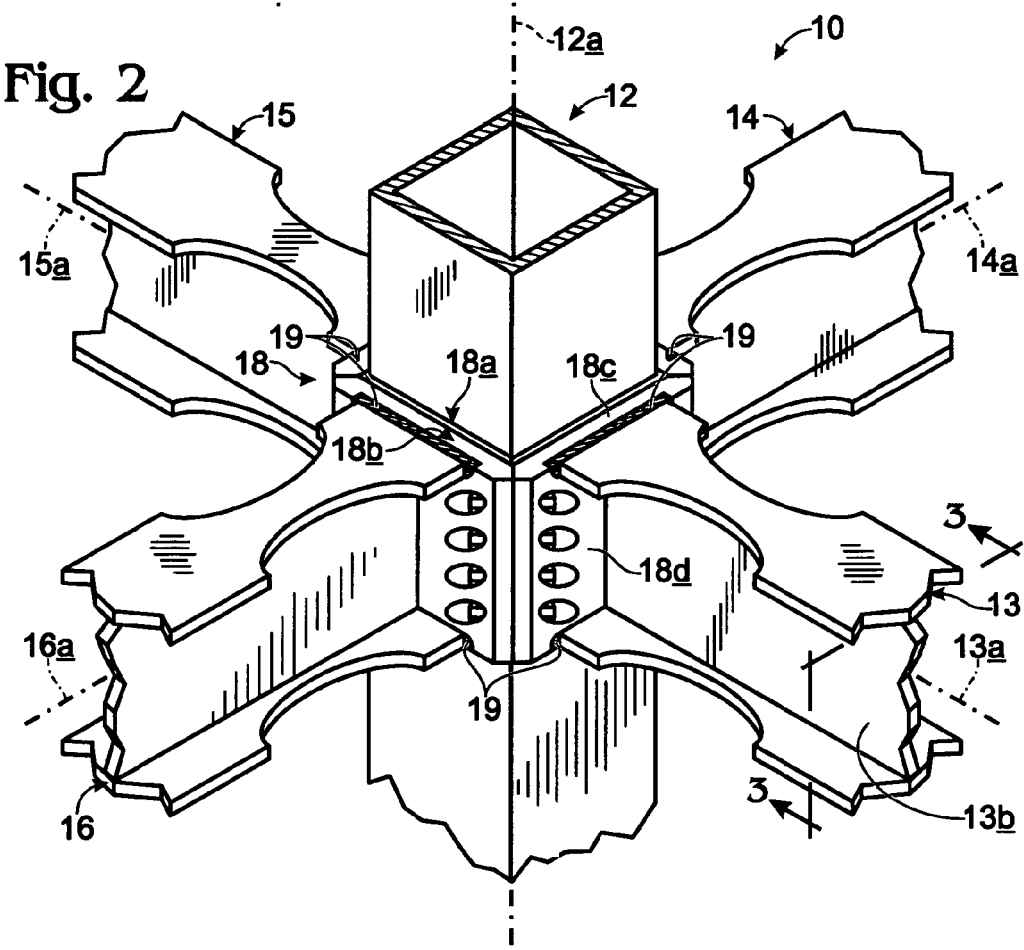

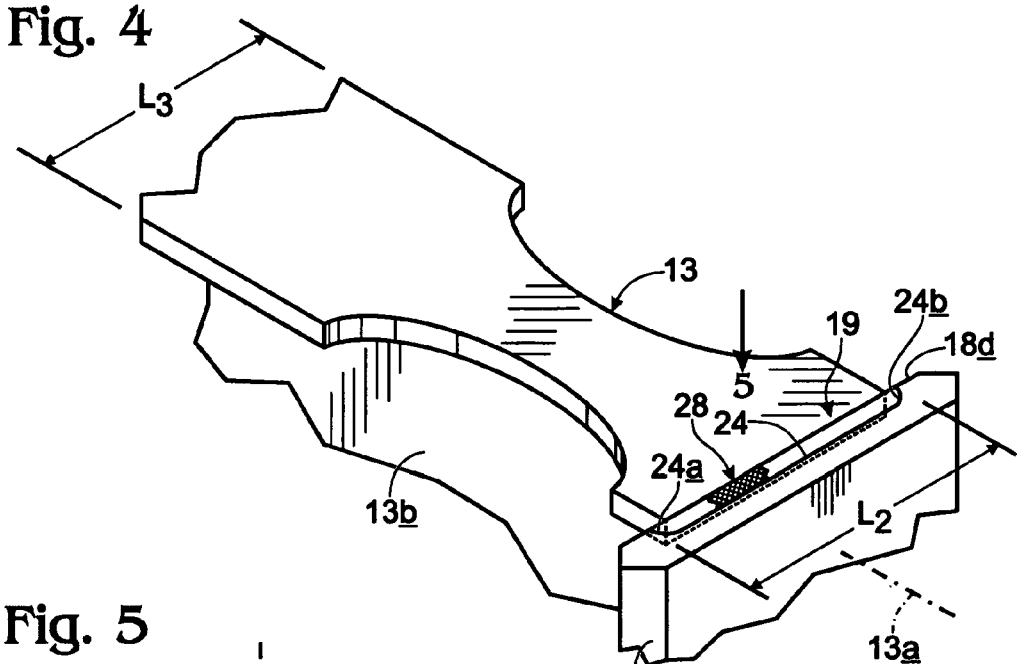
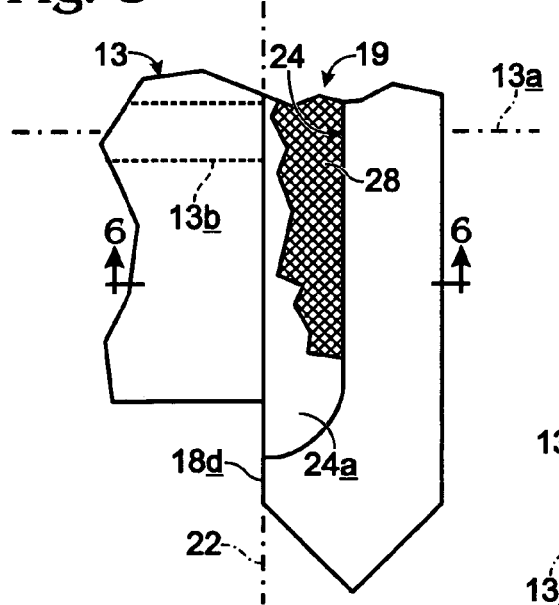
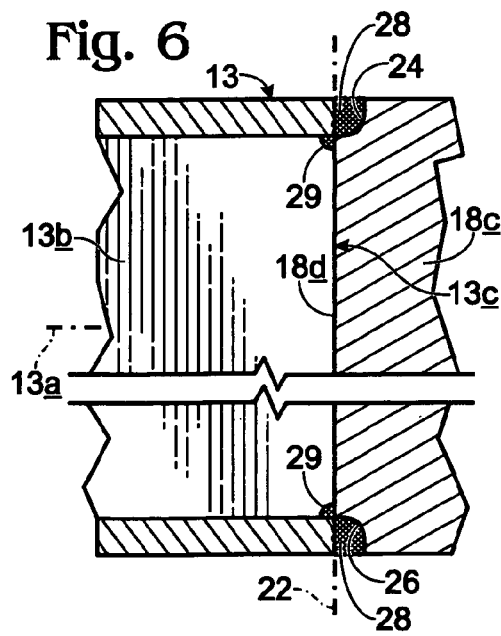

BEAM END WELD PREPARATION

CROSS-REFERENCE TO RELATED APPLICATIONS

This patent application claims appropriate priorities to each of two currently co-pending, same inventorship, prior U.S. Provisional Patent Applications, one of which, Ser. No. 60/424,082, was filed Nov. 5, 2002, disclosing an invention entitled "Weld Preparation", and the other of which, Ser. No. 60/463,898, was filed Apr. 16, 2003, disclosing an invention entitled "Beam End Component Weld Preparation". The respective entire contents of these two prior provisional applications are hereby incorporated herein by reference.

BACKGROUND AND SUMMARY OF THE INVENTION

This invention (structure and methodology) pertains to structural weld preparation in the context of a connective interface between the end of an I-beam, and a beam-attaching end component that is used to connect the beam to a column in a building frame structure.

When, in the construction of a steel building frame, such as a frame for a multi-story building, the end of an I-beam is anchored to the side of a column, it is typical for a weld connection to be made directly between that beam end and appropriate adjoining beam-end connecting structure. In preparation for establishing such a weld, it is also typical that material is removed from the long transverse edges of the flanges at the end of an I-beam to create weld-material-receiving troughs for use when the beam ends are brought into appropriate close relationship with the beam-end structure to which weld-attachment is intended. Additionally, run-on and run-off tabs are usually added to extend the trough ends to insure a full weld section over the full width of a flange. Also, it is customary that back-up bars are added to assist in the achieving of a full-section weld, and to prevent molten weld material from flowing through the joint region at the end of a beam.

This practice involving the use of added tabs and back-up bars creates additional steps of preparation for welding material, adds to construction costs, and can lead to further expense where such tabs and bars must ultimately be removed, as by grinding away, to eliminate potential stress-riser regions in the vicinity of a weld.

The present invention addresses these issues in a simple, effective and practical manner A preferred and best-mode embodiment of, and manner of practicing, the invention involve the creation of elongate, weld-material-receiving troughs in beam-attaching end components to which beam ends are to be welded, rather than in beam-end flanges per se. These troughs are positioned so as to confront directly, and to align with, an I-beam's flanges, and the troughs are prepared with lengths which include opposite end regions that extend laterally beyond the lateral edges of the beam's flanges. These end regions function as run-on and run-off regions for molten weld material, and do so in a manner which obviates the need for any added run-out, etc. tabs.

In a modified form of the invention the mentioned trough end regions are formed in such a fashion that they form walled, containment pockets for molten weld material.

These and other features and advantages which are offered and attained by the structure and methodology of the present invention will become more fully apparent as the detailed description which now follow is read in conjunction with the accompanying drawings.

DESCRIPTION OF THE DRAWINGS

FIG. 1 is a simplified, fragmentary, isometric view showing a portion of a building frame structure which includes an upright column to which four elongate I-beams are shown connected through beam-attaching end components that are joined to the illustrated ends of these beams by a connection interface which include a beam end weld preparation prepared in accordance with practice of the present invention.

FIG. 2 is an enlarged detail showing generally the central portion of FIG. 1.

FIG. 3 is a cross-sectional view taken generally along the line 3—3 in FIG. 2.

FIG. 4 is a further enlarged, fragmentary isometric view illustrating the end of one beam and one attached end component.

FIG. 5 is a still further enlarged, fragmentary view taken generally as indicated by arrow 5 in FIG. 4.

FIG. 6 is a fragmentary cross-sectional view taken generally along the line 6—6 in FIG. 5, and wherein certain portions of structure are removed in order to contain the overall size of the figure.

DETAILED DESCRIPTION OF THE INVENTION

Figure 7:
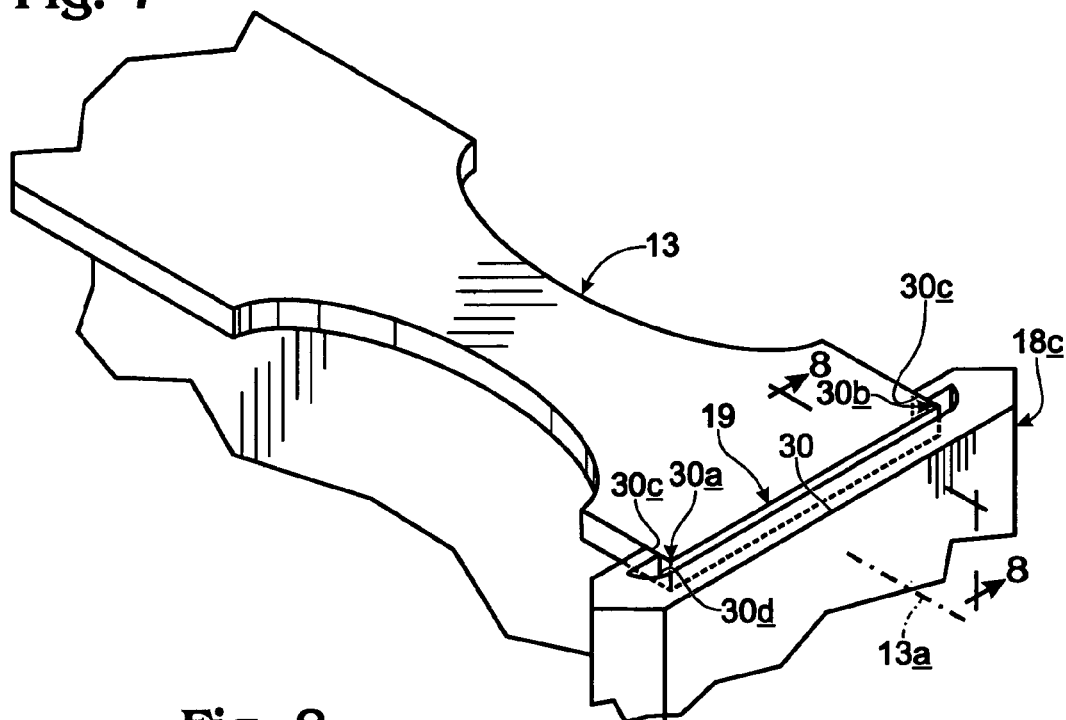
FIGS. 7 and 8 are enlarged views somewhat like FIGS. 4 and 6, respectively, illustrating a modified form of the invention.

Beginning with FIGS. 1–3, inclusive, in the drawings, indicated generally at 10 is a portion of a plural-story building frame including upright hollow, square cross section columns, one of which is shown fragmentarily at 12, horizontal interconnecting I-beams, four of which are shown fragmentarily at 13, 14, 15, 16, and sets of inner and outer, moment and gravity load-transmitting, collar structures, such as those illustrated at 18, that function to form nodal connections between columns and beams. The long axis of column 12 is shown at 12a. The respective long axes of beams 13, 14, 15, 16 are shown at 13a, 14a, 15a, 16a.

In each collar-structure set, an inner collar, such as inner collar 18a is joined as by welding, in a circumsurrounding fashion, to the four outside faces of column 12, and seated thereon, through male-female, gravity-lock mating substructures (not specifically detailed herein) is an outer collar, such as outer collar 18b, which is corner-clamped to and around the associated inner collar. The specific details of these collar structures do not form any part of the present invention. Relevant to the present invention, however, is the fact that outer collar 18b, or if a collar structure is not here employed, some other nodal connecting form using a generally planar beam-end end component, is made up of four generally planar components, such as component 18c, which form, and are referred to herein as, beam-attaching end components that are welded to I-beam ends via weld preparations which are made in accordance with the invention. These weld preparations, which are filled with weld material (as illustrated in FIGS. 2 and 3), are shown generally (and only schematically) as darkened features 19 in FIGS. 2 and 3. The locations where these weld connections exist constitute what is referred to herein collectively as a connective interface. As will now become more apparent, the exact construction of such beam-attaching end components is not critical to practice of the present invention, except for the facts that (a) each such component presents a generally planar beam-attaching facial side (or expanse), such as side 18d, to an I-beam end, and that (b) this side is characterized with a beam-facing expanse which spans what is referred to herein as the end footprint of an I-beam which is to be welded to the component. (See beam footprint designated generally F in FIG. 3).

The weld preparations (19) proposed by the present invention are now described with specific reference only to beam 13, and to the single end component 18c which is so labeled in the drawing figures. There are two such weld preparations and connections provided for each I-beam end, and two of these preparations and connections, an upper one and a lower one, are shown in detail for beam 13 in FIGS. 2–6, inclusive. Very specifically one preferred and best-mode (embodiment) form of a weld preparation made in accordance with the invention is shown in these figures. For simplicity of illustration and description, beam 13 and end component 18c are shown in different orientations in FIG. 4 than they are in FIGS. 1 and 2.

Focusing attention especially on FIG. 4–6, inclusive, here two weld preparations (with welds) are shown at 19 between I-beam 13 and end component 18c with its beam-attaching facial side, or expanse, 18d. The entire end transaxial surfaces, or expanses, of beam 13 are planar, and lie in a common transaxial plane 22 (see FIGS. 5 and 6) which is substantially normal to the beam's long axis 13a. No flange material is removed.

Formed appropriately in end component 18c to which the shown end of beam 13 is welded are upper and lower weld-material-receiving troughs 24, 26. These troughs, as can be seen, are disposed confrontingly adjacent the ends of the flanges in beam 13. Preferably, troughs 24, 26 each has a length L2 (see particularly FIG. 4), which is greater than the defined, common lateral dimensions L3 (see also FIG. 4) of the beam flanges. An important consequence of this is that troughs 24, 26 possess spaced end regions, 24a, 24b in trough 24, that extend laterally beyond the lateral edges of the beam's flanges. These regions function, in accordance with the invention, as run-on and run-out regions, or zones, or pockets, for receiving, along with the remainders of troughs 24, 26, molten weld material, such as that shown (now hardened) at 28. The presence of these end zones which, one will note, do not require the presence of any added run-on and run-off tabs, enable full-strength, full-flange-width welds to be created along the entire lateral dimensions of the beam's flanges. The provision of regions 24a, 24b assures that any potential variables in weld integrity associated with starting or ending a weld procedure will exist beyond and outside of the critical zone immediately along the width of a flange. Additionally, these provided run-on and run-off trough regions do not require any post-welding treatment to eliminate potential stress-riser zones.

Each of troughs 24, 26, along with its respective end regions, such as end regions 24a, 24b, constitutes one form (embodiment) of weld preparation made in accordance with the present invention.

Not shown in the drawings, and not forming part of the present invention, are additional welds which join opposite vertical sides of web 13b to the facial expanse 18d in the vertical region between the weld preparations. Modestly shown at 29 in FIG. 6 are appropriate fillet welds which are suitably created in the regions generally shown.

Practice of the invention to create the structure of the invention so far described herein can be expressed as including the steps of:

(a) preparing a beam end so that its two flanges lie in a substantially common plane which is normal to the beam's long axis;

(b) preparing an end component's beam-attaching facial side with upper and lower, elongate, weld-material-receiving troughs which will confront the beam's flanges;

(c) positioning the prepared beam end and the prepared end component appropriately relative to one another; and (d) producing weld connections by filling the troughs with molten weld material in a manner which joins the beam and end component.

A more detailed expression of a selectable additional step involves creating the mentioned troughs to have lengths which are greater than the widths of the confronting beam's flanges, thus to provide run-on and run-off regions for molten weld material.

During welding, preferably a beam end and an end component are oriented so as to take advantage of gravity in weld formation. A is weld thus preferably first formed in a weld preparation along the length of one beam flange, and then the united beam and end component are rotated 180° about the beam's long axis to accommodate the making of a weld in the other weld preparation along the length of the other flange.

Figure 8:
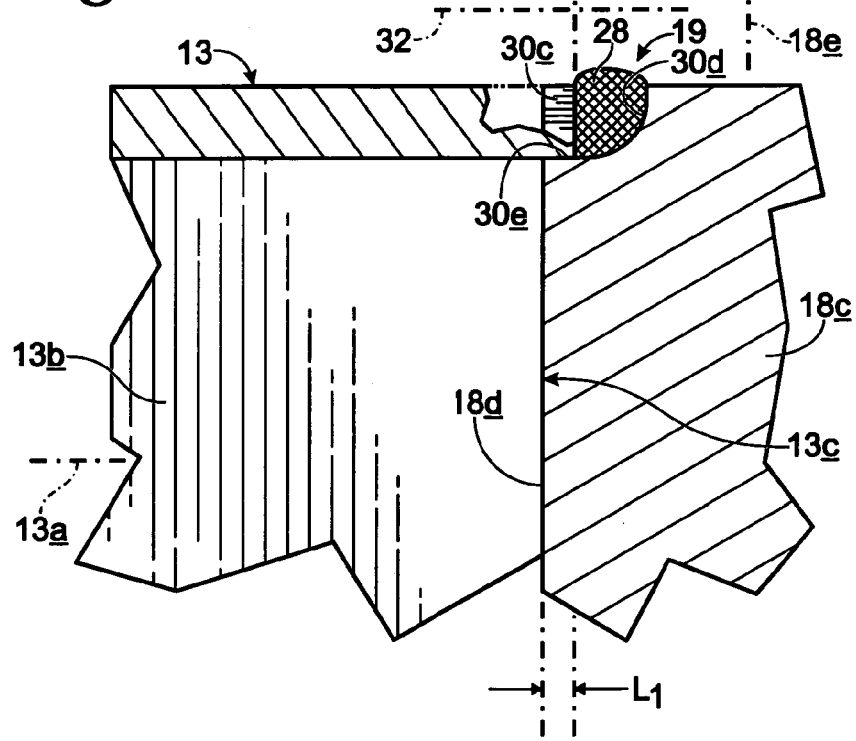

A somewhat modified form and practice of the present invention are illustrated in FIGS. 7 and 8. In this form of the invention, a beam-attaching end component, again identified with the reference designation 18c, is prepared with a somewhat differently configured pair of upper and lower weld preparations with troughs, such as trough 30. The thus differentiated, alternative shape of each trough 30 (as compared to troughs 24, 26) is clearly illustrated in these two figures. Whereas previously described troughs 24, 26, at the locations of the end regions, such as end regions 24a, 24b, are effectively "open ended", this is not so for comparable regions 30a, 30b in trough 30. Regions 30a, 30b are defined, at least in part, as walled cavities, or pockets, by two spaced walls (see walls 30c, 30d) which exists in end component 18c. These walls are spaced along a line, such as line 32, which is substantially normal to the nominal plane 18e (see FIG. 8) of end component 18c.

Preferably, a short length $L_1$ (see FIG. 8) of the beam's central web 13b is removed to provide a web recess 13c. This recess furnishes clearance for the beam's flanges to extend conveniently into the weld preparation troughs, and over shelves, such as shelf 30e (see FIG. 8) in trough 30. In this arrangement, of course, the transaxial end expanse of web 13b is not coplanar with the transaxial end expanses of the two flanges.

In this modification of the invention, no I-beam flange is removed to accommodate welding. Again, no added run-off tabs are required, or employed.

Another form of the invention, useable with both modifications thereof as so far described, involves the creation of an elongate vertical channel in the face of a beam end component, extending between and opening at opposite ends to the two prepared weld-preparation troughs (upper and lower), and possessing a lateral width which will accommodate the free insertion of a beam's central web (like web 13b). In such a form, the entire end of a beam can lie in a common plane, and the flanges will extend over regions in the two troughs which are like just mentioned shelf 30e.

An added practice step involved with this modified form of the invention is that the weld preparation troughs are preformed, at each end, with spaced walls that define a walled cavity which accommodates start-up and run-out of molten weld material.

Accordingly, while preferred and best-mode implementations of, and manners of practicing, the invention have been described and illustrated, it is appreciated that other variations and modifications may be made without departing from the spirit of the invention.

I claim:

1. A method of welding a planar, transaxial end expanse of an elongate structural I-beam to a confronting, beam-attaching facial side in an initially separate, generally planar, beam-attaching end component whose beam-attaching facial side is intended, with the I-beam and end component joined to one another, to span the entire end footprint of the beam, said method comprising preparing the subject beam end by assuring that the two flanges in the beam terminate at the associated end of the beam with generally overall planar expanses which lie in a substantially common transaxial plane which is disposed generally normal to the beam's long axis, preparing the end component's beam-attaching facial side with a pair spaced, elongate troughs which are arranged so as substantially directly to confront the flanges' mentioned planar expanses under circumstances with the beam and component brought into appropriate relative positions preparatory for joinder, and with those relative positions established, producing weld connections which substantially fill the troughs with weld material, thereby to establish weld joinder between the beam and component.

2. The method of claim 1, wherein the prepared troughs are created with lengths which cause opposite end regions of each trough, with the relative positions mentioned between the beam end and component established, to extend laterally beyond opposite lateral edges of the flanges which confront the trough, which regions form weld run-on and run-off zones, and said producing of weld connections includes weld-material filling and utilizing of such zones.

3. The method of claim 2, wherein the formation of the run-on and run-off zones in each trough is performed in such a manner that the ends of each are defined, at least partially, by pairs of elongate opposing spaced walls which are spaced along a line that is disposed generally normal to the plane of the end component.

4. A weld-connective interface between a planar, transaxial end expanse of an elongate structural I-beam having spaced flanges and an interposed central web, and a confronting beam-attaching facial side of a generally planar beam-attaching end component, which facial side is sized to span the entire end footprint of the beam, and where the subject beam end is at least partially defined by substantially overall co-planar, elongate flanges having ends that lie in a transaxial plane which is substantially normal to the beam's long axis, said interface comprising a pair of spaced, elongate troughs formed in said end component, which troughs directly confront said flanges' said ends, and weld material substantially filling said troughs and structurally uniting and joining said beam and said end component.

5. The interface of claim 4, wherein each of said flanges has spaced opposite edges with a defined lateral dimension between said edges, and the associated confronting trough has spaced end regions which extend laterally beyond said edges.

6. The interface of claim 5, wherein each said end region is defined, at least partially, by a pair of elongate, spaced and opposing walls which are spaced along a line that is disposed generally normal to the plane of said end component.

* * * * *

UNITED STATES PATENT AND TRADEMARK OFFICE
CERTIFICATE OF CORRECTION

PATENT NO. : 7,051,917 B2
APPLICATION NO. : 10/699759
DATED : May 30, 2006
INVENTOR(S) : Robert J. Simmons It is certified that error appears in the above-identified patent and that said Letters Patent is hereby corrected as shown below:

Column 5, line 20, "pair spaced" should read -- pair of spaced --

Signed and Sealed this

Twenty-seventh Day of July, 2010

David J. Kappos
*Director of the United States Patent and Trademark Office*